United States Patent [19]
Lee

[11] 3,719,891
[45] March 6, 1973

[54] INTRUDER DETECTION SYSTEM

[75] Inventor: Robert D. Lee, San Mateo, Calif.

[73] Assignee: The United States of America as represented by the Administrator of the National Aeronautics and Space Administration, Washington, D.C.

[22] Filed: Feb. 12, 1971

[21] Appl. No.: 115,083

Related U.S. Application Data

[63] Continuation of Ser. No. 768,662, Oct. 18, 1966, abandoned.

[52] U.S. Cl. .................325/61, 325/45, 325/113, 340/207, 340/258 R, 325/139
[51] Int. Cl. ..................................H03c 5/00
[58] Field of Search........340/15, 16 R, 17, 207, 208, 340/258 R, 258 A, 258 B, 345 B, 261; 325/45, 61, 139, 113, 145

[56] References Cited

UNITED STATES PATENTS

| | | |
|---|---|---|
| 3,070,773 | 12/1962 | Woolston et al..................325/113 X |
| 3,258,762 | 6/1966 | Donner..............................340/16 X |
| 3,387,296 | 6/1968 | Epstein et al......................340/207 X |
| 3,480,942 | 12/1969 | Hirschberg............................340/261 |
| 3,483,562 | 12/1969 | Santelmann, Jr...................325/61 X |

Primary Examiner—Benedict V. Safourek
Attorney—Darrell G. Brekke and G. T. McCoy

[57] ABSTRACT

An intruder detection system in which a transmitter transmits a frequency modulated and amplitude modulated signal to a remote receiver in response to a transducer, such as a geophone detector, picking-up seismic impulse created by one or more intruders. In this manner, an operator listening to the receiver can identify the number of intruders, and also can identify the movements of the intruder or intruders, such as walking, running and the like.

6 Claims, 4 Drawing Figures

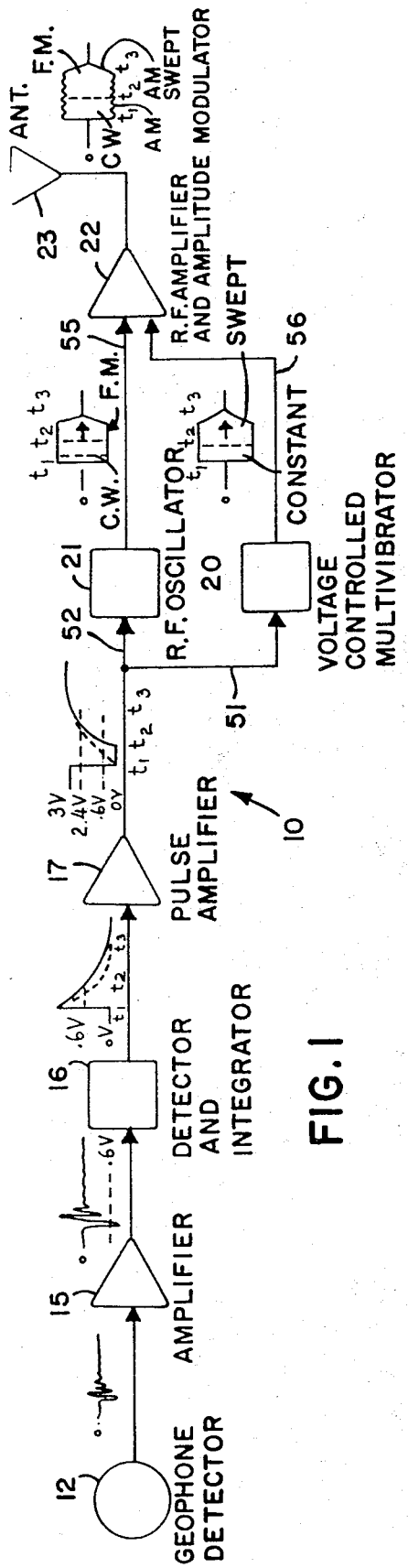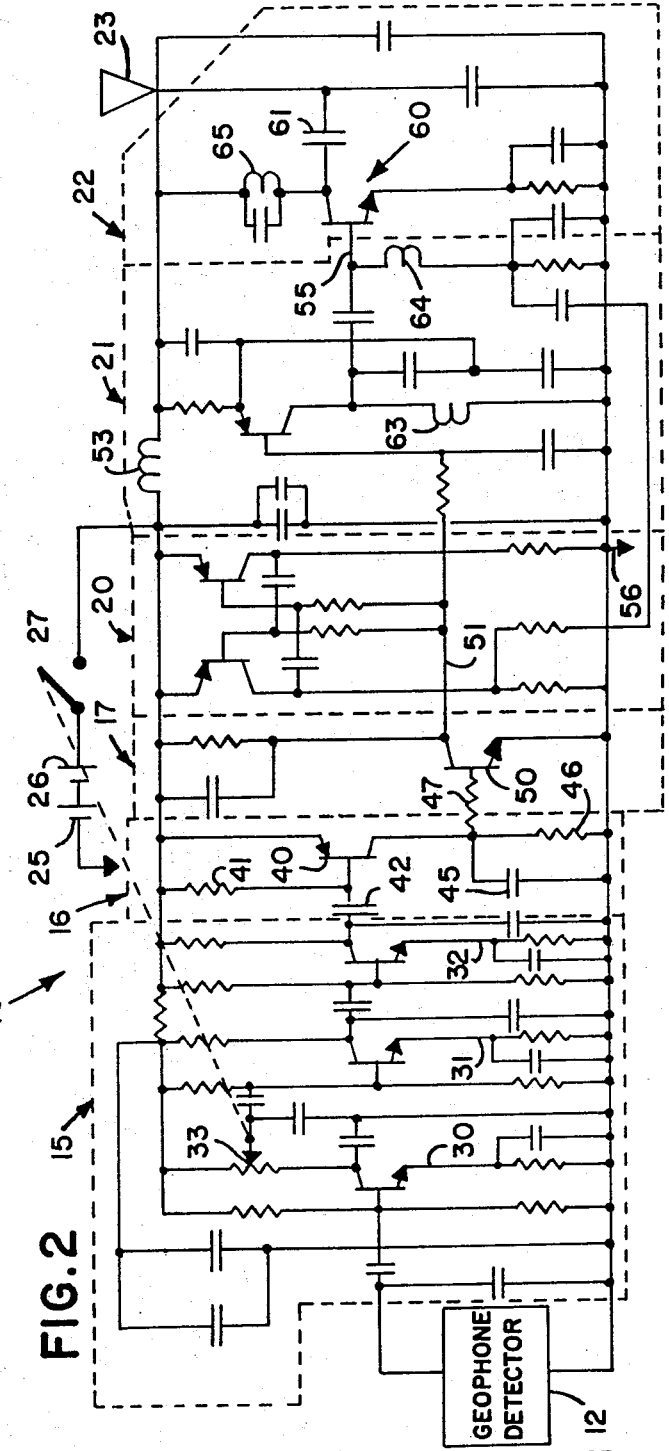

INVENTOR.
ROBERT D. LEE

INTRUDER DETECTION SYSTEM

This is a continuation of Ser. No. 768,662, filed Oct. 18, 1968 now abandoned.

The invention described herein was made by an employee of the United States Government and may be manufactured and used by or for the Government for governmental purposes without the payment of any royalties therein or therefor.

BACKGROUND OF THE INVENTION

The present invention relates to intruder detection systems, and more particularly to a seismic detecting intruder detection system.

Various intruder detector systems have been known in which sound or sonic waves are detected through a transducer. Audio frequency signals are produced in the output of the transducer for operating an alarm or an indicator when the sound detected is above a preselected level or amplitude, or when the frequency thereof is within predetermined frequency ranges. Such intruder detector systems are disclosed in the patent to Lienan et al. U.S. Pat. No. 2,942,247; Larrick et al. U.S. Pat. No. 3,049,669; Foster U.S. Pat. No. 3,379,994; and Bagno U.S. Pat. No. 3,109,165.

In the intruder detector systems heretofore employed, the sound of the alarm or indicator was of fixed or constant frequency and did not vary with respect to the movement of the intruder or the number of intruders. Basically, the alarm was either turned on or turned off, and the alarm did not indicate any factor other than the presence or absence of an intruder.

SUMMARY OF THE INVENTION

An intruder detection system in which a frequency modulated and amplitude modulated system is transmitted to a remote receiver in response to a transducer picking-up sound created by one or more intruders and wherein an operator sensing the sound or audio signal reproduced by the receiver can identify the number of intruders and the movement of one or more intruders.

It is an object of the present invention to provide an intruder detection system in which the number of intruders and the movement of one or more intruders can be identified.

Another object of the present invention is to provide an intruder detection system in which the sound or audio frequency signal produced in the output of a receiver enables an operator to identify the number of intruders and the movement of one or more of the intruders.

Another object of the present invention is to provide an intruder detection system in which a receiver produces an aural signal for each seismic impulse, such as a footstep, during the presence of one or more intruders, which aural signal is an amplitude, frequency varying tone or audio signal for identifying the number of intruders and the movement of one or more of the intruders.

Other and further objects and advantages will appear upon perusal of the detailed description of the invention taken in conjunction with the accompanying drawings.

BRIEF DESCRIPTION OF THE DRAWINGS

FIG. 1 is a block diagram of the telemetering transmitter of the intruder detection system of the present invention.

FIG. 2 is a schematic diagram of the telemetering transmitter shown in FIG. 1.

DESCRIPTION OF THE PREFERRED EMBODIMENTS

Figures 3, 4:
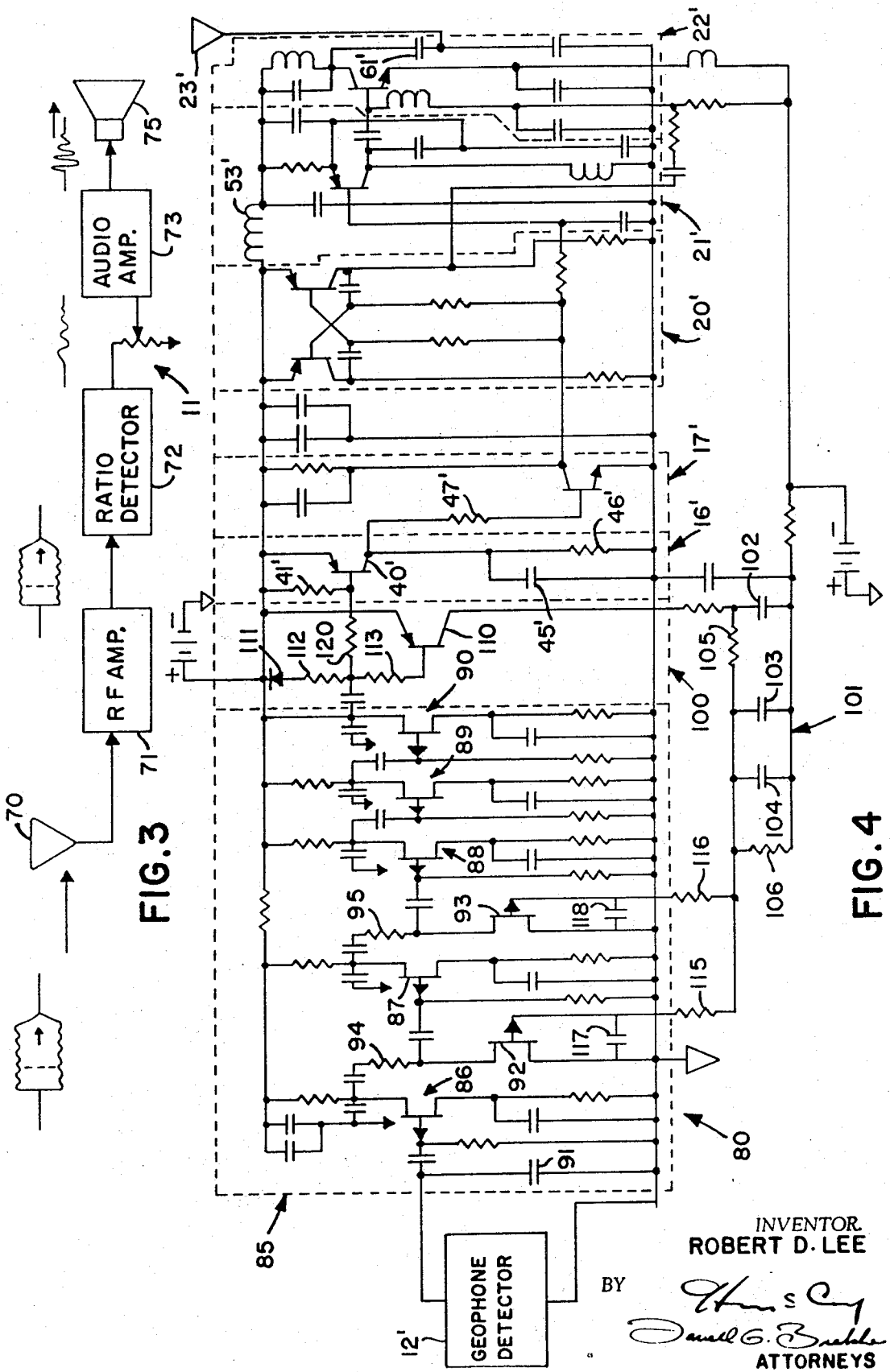
FIG. 3 is a block diagram of the receiver employed in the intruder detection system of the present invention.
FIG. 4 is a schematic diagram of a modification of the telemetering transmitter shown in FIGS. 1 and 2 employing an automatic gain control circuit.

Illustrated in FIG. 1 is the telemetering transmitter 10 of the intruder detection system 10 of the present invention. EAch detected seismic impulse from one or more intruders, such as a footstep, produces an aural signal that changes both in amplitude and in frequency. The transmitter 10 picks-up each detected seismic impulse and transmits an amplitude and frequency modulated radio frequency signal for each sound to a remote receiver 11 (FIG. 3). The remote receiver 11 produces a distinct sweeping audio tone for each sound picked-up by the transmitter 10. Each tone produced by the receiver 11 will vary in accordance with the amplitude-frequency thereof. An operator with experience can learn to identify the number of intruders present and the type of movement in progress by the intruders, such as walking, running and the like.

The telemetering transmitter 10 comprises a suitable transducer, such as a conventional geophone seismic detector 12, which serves to detect each seismic impulse produced by one or more intruders, such as a footstep. Each seismic impulse detected will vary both in amplitude and in frequency. In turn, the geophone detector 12 produces from each seismic impulse an alternating current signal that varies both in amplitude and in frequency. Such geophone detectors are manufactured by Mark Products, Inc. and Geospace, Inc. with moving magnets. Frequency ranges are in the vicinity of 8–28 cycles and can be up to 200 cycles.

The detector 12 may be located within a building or outside of any protective shelter. Within a building, the detector 12 may be placed on the floor, on the safe, or on a shelf or cabinet for the convenience of the area to be monitored. Outside a protective shelter, the detector 12 may be buried in the soil, pushed in the soil or placed on top of the soil. For improved detection, the detector 12 may be vertically oriented on the soil or floor.

A suitable amplifier 15 amplifies the alternating current signal for each seismic impulse detected by the geophone detector 12. Connected to the output of the amplifier 15 is a detector and integrator circuit 16, which produces a sawtooth pulse having integrated therein the amplitude and frequency varying signal produced by the geophone detector 12. The sawtooth pulse is fed to a suitable pulse amplifier 17.

Connected to the output of the pulse amplifier 17 is a voltage controlled multivibrator 20 and a radio frequency oscillator 21. Thus, the output sawtooth signal from the pulse amplifier 17 changes the state of the voltage controlled multivibrator 20 and frequency modulates the carrier frequency produced by the radio frequency oscillator 21.

In each seismic impulse detected by the geophone detector 12, the multivibrator 20 produces a square wave output of a complete sweep in the sweep range of 2-3 kHz. Also, the radio frequency oscillator 21 makes a complete sweep for each sound produced by the geophone detector 12. The output signals produced by the multivibrator 20 and the radio frequency oscillator 21 are fed simultaneously to a radio frequency amplifier and an amplitude modulator circuit 22, which produces for each seismic impulse detected by the geophone detector 12 a radio frequency signal that is both amplitude and frequency modulated for transmission through a conventional antenna 23. The magnitude of change in the amplitude modulation of the signal is controlled by the multivibrator 20 and the magnitude of change of the frequency modulated component is controlled by the sawtooth pulse and the radio frequency oscillator 21.

A suitable source of power is provided for the transmitter 10 through conventional batteries 25 and 26. On-off switch 27 is closed for operating the transmitter 10 by completing the energizing circuit to the batteries 25 and 26.

The amplifier 15 includes conventional transistorized alternating current amplifiers 30-32. Through a gain potentiometer 33, the overall amplification of the amplifiers 30-32 is controlled. When a seismic impulse is detected by the geophone detector 12, such as a footstep of an intruder, the geophone detector 12 produces an alternating current signal varying in amplitude and frequency, which is amplified by the amplifiers 30-32 and fed to the detector and integrator circuit 16.

When the output signal from the amplifier 32 exceeds the forward bias of a transistor 40 in the detector and integrator circuit 16, the transistor 40 is turned on or conducts. Forward bias for the transistor 40 is derived from a source resistor 41 and a coupling capacitor 42. While the transistor 40 conducts, a capacitor 45 in the detector and integrator circuit 16 charges. The capacitor 45 discharges at a time constant determined by a resistance-capacitance network, which includes the capacitor 45 and resistors 46 and 47. The time is equal to $C_{45}(R_{46} R_{47}/R_{46} + R_{47})$. It is the capacitor 45 and the resistors 46 and 47 that form the integrating network for the detector and integrator circuit 16.

Normally, a transistor 50 of the pulse amplifier 17 is non-conducting. However, the charge stored in the capacitor 45 along with the resistors 46 and 47 of the integrating network controls the period of saturation of the transistor 50 and the exponential voltage rise of the sawtooth pulse produced in the output of the pulse amplifier 17. The transistors 40 and 50 remain turned-off or non-conducting until the output signal of the amplifier 32 exceeds the forward bias on the transistor 40.

When the pulse amplifier 17 is conducting, or is turned on, the output signal therefrom changes the state or mode of the conventional voltage-controlled multivibrator 20 over a conductor 51 and simultaneously frequency modulates the conventional radio frequency oscillator 21. A radio frequency choke coil 53 is disposed between the multivibrator 20 and the radio frequency oscillator 21. For each seismic impulse detected by the geophone 12, such as a footstep, the multivibrator 20 is swept through a range between 2-3 kHz. It is the exponential portion of the output signal from the pulse amplifier 17 that controls the extent of the frequency range for the voltage controlled multivibrator 20. It also is the exponential portion of the output signal from the pulse amplifier that frequency modulates the radio frequency oscillator 21. Accordingly, for each seismic impulse detected by the geophone detector 12, such as a footstep, the radio frequency oscillator 21 is frequency modulated for a complete sweep while the voltage controlled multivibrator 20 is swept. While reference is made to the exponential portion of the pulse for controlling the operation of the radio frequency oscillator 21 and the multivibrator 20, it is apparent that the decay portion of a sawtooth pulse performs the same control operations.

Connected to the output of the radio frequency oscillator 21 over a conductor 55 and connected to the output of the multivibrator 20 over a conductor 56 is the radio frequency amplifier and amplitude modulator circuit 22. It is the output of the multivibrator 20 that amplitude modulates the radio frequency signal at the input of the radio frequency amplifier 22 through a connection to the base electrode of a transistor 60 in the radio frequency amplifier and modulator circuit 22. Through this arrangement, the bias on the transistor 60 is varied or there is base injection to modulate the radio frequency amplifier and modulator circuit 22. The output of the radio frequency oscillator 21 is connected to the base electrode of the transistor 60 in the radio frequency amplifier and modulator circuit 22. The collector electrode of the transistor 60 is coupled to a resonant output circuit 65, which is coupled to the antenna 23 through a coupling capacitor 61. For regulating the carrier frequency of the transmitter 10, the inductances of coils 63 and 64 in the radio frequency oscillator 21 are adjusted to the same resonant frequency.

During standby or quiescent time, only the amplifiers 30-32 and their bias circuits are consuming direct current power. The remaining circuits are off. The resistance values in the amplifier circuits 30-32 are selected at relative high values to consume very low standby power from the batteries 25 and 26. Thus, long battery life is attained by standby operation until the seismic impulse of an intruder is detected by the geophone 12.

In the operation of the transmitter 10, the geophone detector 12 detects each seismic impulse, such as a footstep, produced by an intruder. Each seismic impulse has an amplitude and frequency varying tone. The geophone detector 12 converts each seismic impulse into an alternating current signal with amplitude and frequency varying components.

The amplifier 15 amplifies the alternating current signal produced by the geophone detector and feeds the amplified alternating current signal to the detector and integrator circuit 16. In the exemplary embodiment, the forward bias on the transistor 40 of the detector and integrator circuit 16 is 0.6 volts. When the input signal to the detector and integrator circuit 16 exceeds 0.6 volts, which is at a time $t_1$, the transistor 40 conducts or is turned on. While the transistor 40 conducts, the capacitor 45 charges. When the transistor 40 is turned-off, the capacitor 40 discharges through the resistors 46 and 47. The discharge time for the capacitor 40 is between $t_2$ and $t_3$ and is equal to $C_{45}(R_{46}R_{47}/R_{46} + R_{47})$. Thus, the capacitor 45 and the resistors 46 and 47 form a sawtooth signal with the amplitude variation and frequency variation of the geophone audio frequency signal integrated therein. The time periods $t_1$, $t_2$ and $t_3$ are shown in FIG. 1 in connection with the waveforms illustrated therein.

When the transistor 40 of the detector and integrator circuit 16 is turned on, the transistor 50 of the pulse amplifier 17 is turned on, which results in the amplification of the sawtooth pulse. Thus, the exponential rise time $t_2 - t_3$ of the amplified sawtooth signal is the discharge time for the capacitor 45 of the resistance-capacitance network of capacitor 45 and the resistors 46 and 47.

During the exponential rise time of the amplified sawtooth signal, the radio frequency oscillator 21 is turned on to produce a frequency modulated radio frequency signal having a complete sweep for each seismic impulse detected by the geophone detector 12. Simultaneously, the voltage controlled multivibrator 20 has its state or mode changed over a frequency range or time period equal to the exponential rise time of the amplified sawtooth signal, which is equal to a complete sweep for each sound detected by the geophone detector 12.

The frequency modulated signal in the output of the radio frequency oscillator 21 is fed to the radio frequency amplifier and amplitude modulating circuit 22. Simultaneously, the square wave output of the multivibrator 20 is fed to the input of the radio frequency amplifier and amplitude modulating circuit 22 to amplitude modulate the modulated radio frequency signal. As a result thereof, the antenna 23 transmits an amplitude modulated-frequency modulated radio frequency signal.

In FIG. 3 is illustrated the receiver 11, which receivers the amplitude modulated-frequency modulated radio frequency signal from the transmitter 10 through a suitable antenna 70. This signal is amplified by a conventional radio frequency amplifier 71 and fed to a suitable ratio detector 72. Ratio detector circuits are commonly employed in transistorized radio receivers, and are capable of detecting both amplitude modulated radio frequency signals and frequency modulated radio frequency signals. The ratio detector 72 detects both the amplitude modulated component and the frequency modulated component of the radio frequency amplified by the amplifier 71. The output of the ratio detector 72 for each seismic impulse, such as a footstep, is comparable to the amplitude modulating signal input to the radio frequency amplifier output of the detector and integrator circuit 16. Specifically, the output of the ratio detector for each seismic impulse, such as a footstep, or sweep has two separate components, one the amplitude modulating component and the other the frequency modulating component.

The output of the ratio dectector 22 is transmitted to an audio amplifier, which feeds the amplified audio signal to a suitable speaker 75. The sound produced by the speaker 75 sounds like an aural amplitude, frequency varying tone representing a seismic impulse from an intrusion.

Illustrated in FIG. 4 is a telemetering transmitter 80, which is a modification of the telemetering transmitter shown in FIG. 1. Items in the transmitter 80 corresponding to items in the transmitter 10 will be shown with the same reference numeral but accompanies by a prime suffix.

In the telemetering transmitter 10, the amplitude of the amplifiers 30–32 of the audio amplifier 15 was controlled manually by the variable resistor 33. In the transmitter 80 an automatic gain control circuit is provided in lieu of the manually adjusted gain control potentiometer 33.

The telemetering transmitter 80 operates in substantially the same manner as does the telemetering transmitter 10 in that the geophone detector 12' senses a seismic impulse, such as a footstep, and produces therefrom an alternating current signal varying in amplitude and frequency. The transmitter 80 in response to the alternating current signal transmits a radio frequency signal which is frequency and amplitude modulated. Toward this end, a radio frequency oscillator is frequency modulated and a voltage tuned multivibrator changes its state to amplitude modulate the frequency modulated radio frequency signal. These modulating actions are under the control of a detector and integrator circuit.

Specifically, in the telemetering transmitter 80, the geophone detector 12' senses a seismic impulse, such as a footstep, and feeds to an alternating current amplifier 85 an alternating current signal varying in amplitude and in frequency. The alternating current amplifier 85 comprises conventional alternating current transistor amplifiers 86–90. Connected to the input circuits of the amplifier 86 is a suitable r-f filter circuit 91 and connected to the input circuits of the amplifiers 87 and 88 are voltage controlled resistors 92 and 93, respectively, in the form of well-known field-effect transistors. The voltage controlled resistors 92 and 93 form a voltage divider network with resistors 94 and 95, respectively.

Connected to the output of the amplifier 90 of the alternating current amplifier 80 is an automatic gain control detector circuit 100. Associated with the automatic gain control detector circuit 100 is a gain time constant integrating circuit 101, which comprises capacitors 102–104 and resistors 105–106.

The automatic gain control circuit 100 includes a transistor 110, a diode 111, and resistors 112 and 113. The output signal from the geophone detector 12' is r-f filtered by the filter circuit 91 and amplified by the amplifiers 86–90. The amplified alternating current signal is fed to the automatic gain control detector circuit 100. When the peak voltage of the amplified alternating current signal is above a predetermined magnitude, namely the forward bias on the transistor 110 of the detector circuit 100 established by the diode 111 and the resistors 112 and 113, the transistor 110 is turned on or starts to conduct. This is accomplished through the peaks of the wave signals appearing in the output of the amplifier 90.

As a consequence thereof, the capacitors 102–104 of the gain time constant integrating circuit 101 are charged. The potential across the capacitors 102–104 will vary the resistance of the voltage controlled resistors 92 and 93 through resistors 115 and 116 and filter capacitors 117 and 118. As previously described, the voltage controlled resistors 92 and 93 form resistance networks with the resistors 94 and 95, respectively.

During the quiescent state, or when the geophone detector 12' does not sense any seismic impulse, such as a footstep, seismic background noises will produce a noise level output in the geophone detector 12'. Such noise signals will cause the capacitors 102–104 to be charged. When the resistance of the voltage controlled resistors 92 and 93 are varied by the noise potential across the capacitors 102–104, the overall gain of the alternating current amplifier 85 is decreased until the peak noise signals produced in the output of the geophone detector 12' cannot turn on or trigger the transistor 110 of the automatic gain control circuit 100 by overcoming the forward bias thereof. At this time, the gain is properly adjusted.

A detector and integrator circuit 16' with a transistor 40' is connected to the output of the amplifier 90, which operates in the manner described for the detector and integrator circuit 16. When the output of the amplifier 90 reaches a peak-to-peak quiescent value, any slight increase in the noise level will turn on or trigger the transistor 110 of the automatic gain control detector 100, but it will not turn on or trigger the transistor 40' of the detector and integrator circuit 16'.

With an increasing input signal applied to the amplifier 86 from the geophone detector 12' through the filter 91, the transistor 110 of the automatic gain control detector circuit 100 causes an increase of charge and potential across the capacitors 102–104 of the gain time constant circuit 101. This action causes an increase in the gate bias for the voltage controlled resistors 92 and 93 through the resistors 115 and 116, respectively. As a consequence thereof, the resistance between the source and drain electrodes for the voltage controlled resistors 92 and 93 decreases, respectively. Since the voltage controlled resistors are part of voltage divider networks in conjunction with the resistors 94 and 95, respectively, less signal appears across the voltage controlled resistors 92 and 93.

As the charge stored in the capacitors 102–104 of the gain time constant circuit 101 discharges through the resistors 105 and 106, the resistance of the voltage controlled resistors 92 and 93 increases and now more signal appears across the voltage controlled resistors 92 and 93. This action turns on the transistor 110 of the automatic gain control circuit 100 to once again charge the capacitors 102–104 of the gain time constant integrating circuit 101.

Should the capacitors 102–104 of the gain time constant integrating circuit 101 be fully discharged at the time the transistor 110 of the automatic gain control circuit 100 is turned on initially, then the gain of the alternating current amplifier 80 is at a maximum. Conversely, if the capacitors 102–104 are fully charged at the time the transistor 110 is turned on initially, then the gain of the alternating current amplifier 80 is at a minimum.

The frequency response of the alternating current frequency amplifier 80 is limited by the magnitude of the resistors 94 and 95 and the input interelectrode capacitance of the voltage controlled resistors 92 and 93. In the exemplary embodiment, the frequency range for the alternating current amplifier 80 is from 5hz to 200hz. This frequency response range is ideally suited to the seismic frequency range of the geophone 12' which has a peak at 8hz and a maximum of 200hz. It is to be observed that the transmitter 80, as well as the transmitter 10, operate on the principle of signal impulses and not seismic signature processing. Therefore, the resonance peak characteristics of the geophone detector 12' are employed. The frequency range above referred to in connection with the transmitter 80 is equally applicable to the transmitter 10.

During the time the automatic gain control detector 100 is self-adjusting from a high maximum gain level, the detector and integrator circuit 16' is turned on to change the state of voltage controlled multivibrator circuit 20' and to frequency modulate a radio frequency oscillator 21'. The output of the voltage controlled multivibrator 20' amplitude modulates a frequency modulated radio frequency signal fed to a radio frequency amplifier and modulating circuit 22' by the radio frequency oscillator 21'. This operation is the same as the operation previously described for the circuits 16, 17, 20, 21 and 22 of transmitter 10.

However, at the time the automatic gain control detector circuit 100 approaches the proper gain setting, the transistor 40' of the detector and integrator circuit 16' turns off, because its the bias resistors 41' and 120 reach the quiescent level, while the automatic gain control detector circuit 100 is making its final overall gain adjustment.

Should an intruder approach the range of the geophone detector 12', his footstep will generate a sound which is amplified by the alternating current amplifier 80 to turn on the transistor 40' of the detector and integrator circuit 16'. When intrusion occurs, the gain of the alternating current amplifier 80 also changes. The change is to decrease the gain. However, the automatic gain control time constant capacitors 102–104 and resistors 105 and 106 are set long enough that the alternating current amplifier 15 will recover and be ready in sufficient time for the next intruder step.

The geophone detector has been employed herein as detecting seismic impulses. It is apparent that the geophone detector detects seismic vibrations, seismic waves, acoustic waves and the like.

It is to be understood that variations and modifications may be effected without departing from the spirit of the invention and the scope of the appended claims.

What I claim as new and desire to protect by Letters Patent is:

1. Seismic sensor apparatus comprising:
   transducer means for sensing seismic impulses and generating a-c signal bursts in response thereto;
   menas coupled to said transducer means for detecting the envelope of each of said bursts exceeding a minimum threshold level and generating a modulating signal which is a function thereof, said modulating signal comprising a series of pulses;
   means coupled to said detecting means for transmitting an a-m and f-m modulated r-f signal burst whenever a pulse occurs, said a-m and f-m modulation each being a function of the particular pulse shape, and said r-f signal burst duration being substantially the same duration as it's respective pulse.

2. Seismic sensor apparatus comprising:

transducer means for sensing seismic impulses and generating a-c signal bursts in response thereto;

means coupled to said transducer means for detecting the envelope of each of said bursts exceeding a minimum threshold level and generating a modulating signal which is a function thereof, said modulating signal comprising a series of pulses;

an r-f signal transmitter;

means coupled to said transmitter for modulating said r-f signal in accordance with said modulating signal;

means for receiving and demodulating said r-f signal;

means coupled to said receiving and demodulating means for generating sound bursts, a sound burst being generated for and as a result of each of said pulses, each sound burst having a portion wherein the frequency is swept.

3. Seismic sensor apparatus comprising:

transducer means for sensing seismic impulses and generating a-c signal bursts in response thereto;

means coupled to said transducer means for generating a modulating signal which is a function of th envelopes of said a-c signal bursts which exceed a predetermined level, said modulating signal comprising a series of pulses each having an exponential portion, there being one pulse for each burst which exceeds said predetermined level;

an r-f signal transmitter;

means coupled to said transmitter for modulating said r-f signal in accordance with said modulating signal;

means for receiving and demodulating said r-f signal;

means coupled to said receiving and demodulating means for generating sound bursts, a sound burst being generated for and a result of each of said pulses, each sound burst having a portion wherein the frequency is swept as a function of the exponential portion of said pulse causing that sound burst.

4. Seismic sensor apparatus comprising:

transducer means for sensing seismic impulses and generating a-c signal bursts in response thereto;

means coupled to said transducer means for detecting the envelope of each of said bursts exceeding a minimum threshold level and generating a modulating signal which is a function thereof;

a voltage-controlled r-f oscillator capable of generating an r-f signal the frequency of which is dependent on the magnitude of an input signal, said voltage-controlled r-f oscillator having an input and an output;

means for coupling said modulating signal to said input of said r-f oscillator to frequency modulate said r-f signal in accordance with said modulating signal;

a voltage-controlled audio oscillator capable of generating an audio signal the frequency of which is dependent on the magnitude of an input signal, said voltage-controlled audio oscillator having an input and an output;

means for coupling said modulating signal to said input of said voltage-controlled audio oscillator to frequency modulate said audio signal in accordance with said modulating signal;

means connected to said output of said audio oscillator for amplifying and amplitude modulating said frequency-modulated r-f signal generated by said r-f oscillator, said r-f signal being amplitude modulated in accordance with said audio signal; and means connected to said amplifying and modulating means for transmitting said frequency and amplitude modulated r-f signal.

5. Seismic sensor apparatus comprising:

transducer means for sensing seismic impulses and generating a-c signal bursts in response thereto;

means coupled to said transducer means for generating a modulating signal which is a function of the envelopes of said a-c signal bursts which exceed a predetermined level, said modulating signal comprising a series of pulses, one for each envelope;

a voltage-controlled r-f oscillator capable of generating an r-f signal the frequency of which is dependent on the magnitude of an input signal, said voltage-controlled r-f oscillator having an input and an putput;

means for coupling said modulating signal to said input of said r-f oscillator to frequency modulate said r-f signal in accordance with said modulating signal;

a voltage-controlled audio oscillator capable of generating an audio signal the frequency of which is dependent on the magnitude of an input signal, said voltage-controlled audio oscillator having an input and an output;

means for coupling said modulating signal to said input of said voltage-controlled audio oscillator to frequency modulate said audio signal in accordance with said modulating signal;

means connected to said output of said audio oscillator for amplifying and amplitude modulating said frequency-modulated r-f signal generated by said r-f oscillator, said r-f signal being amplitude modulated in accordance with said audio signal; and means connected to said amplifying and modulating means for transmitting said frequency and amplitude modulated r-f signal.

6. Transmitter apparatus comprising:

a geophone for generating an a-c signal whenever a seismic impulse is detected;

means for amplifying, detecting and integrating said a-c signal to produce a modulating signal;

a voltage-controlled r-f oscillator generating an r-f signal and having an input and an output;

a voltage-controlled multivibrator generating an output signal and having an input and output; means for coupling said modulating signal to said input of said r-f oscillator to produce an f-m modulated r-f signal at said r-f oscillator output;

means for coupling said modulating signal to said input of said multivibrator to produce an f-m modulated output signal;

means connected to said output of said r-f oscillator for amplifying and amplitude modulating said modulated r-f signal;

said output of said multivibrator being coupled to said amplifying and modulating means, said modulated r-f signal being amplitude modulated in accordance with said modulated output signal; and antenna means connected to said amplifying and modulating means for radiating the twice-modulated r-f signal.

* * * * *